US008761351B1

(12) United States Patent
Daly et al.

(10) Patent No.: US 8,761,351 B1
(45) Date of Patent: Jun. 24, 2014

(54) AUTOMATED MANAGEMENT OF INFORMATION VIA AN EMERGENCY OPERATIONS CENTER

(75) Inventors: Brian Kevin Daly, Seattle, WA (US); DeWayne Allan Sennett, Redmond, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 1529 days.

(21) Appl. No.: 11/937,064

(22) Filed: Nov. 8, 2007

(51) Int. Cl.
H04M 11/04 (2006.01)
(52) U.S. Cl.
CPC ................................. *H04M 11/04* (2013.01)
USPC .................... 379/45; 379/37; 379/41; 379/50
(58) Field of Classification Search
USPC ....................................................... 379/37–51
See application file for complete search history.

(56) References Cited

U.S. PATENT DOCUMENTS

| | | | |
|---|---|---|---|
| 6,112,075 A | 8/2000 | Weiser | |
| 6,754,335 B1 * | 6/2004 | Shaffer et al. | 379/266.02 |
| 2006/0040639 A1 | 2/2006 | Karl et al. | |
| 2006/0147008 A1 * | 7/2006 | Blossom et al. | 379/202.01 |
| 2007/0250348 A1 * | 10/2007 | D'Ambrosia et al. | 705/3 |
| 2008/0175356 A1 * | 7/2008 | Seidberg et al. | 379/45 |
| 2008/0261554 A1 * | 10/2008 | Keller et al. | 455/404.1 |

OTHER PUBLICATIONS

WebEOC Professional, ESI, Jul. 2012, http://www.esi911.com/esi/images/pdfs/DataSheets/WebEOC%20Professional.pdf.*

* cited by examiner

*Primary Examiner* — Melur Ramakrishnaiah
(74) *Attorney, Agent, or Firm* — Baker & Hostetler LLP

(57) ABSTRACT

Information received from a first responder on the scene of an emergency event is automatically distributed and managed by an Emergency Operations Center (EOC) via various combinations of emails, databases, Internet Protocol (IP) networks, speech to text converters, and distribution systems. In one example embodiment, information is provided by a first responder via an IP network. The first responder has access to various services such as, instant messaging, Push-to-Talk over Cellular (PoC), Presence information, location based services, wireless priority services, multimedia priority services, voice of IP (VoIP), or a combination thereof. The information provided by the first responder, via the IP network is stored in an EOC database for access by various EOC related entities. In another example embodiment, information provided by a first responder is converted from speech to text, and the text is stored in an EOC database for access by various EOC related entities.

19 Claims, 5 Drawing Sheets

AUTOMATED MANAGEMENT OF INFORMATION VIA AN EMERGENCY OPERATIONS CENTER

TECHNICAL FIELD

The technical field generally relates to communications systems and more specifically relates to the automatic provision of information via an Emergency Operations Center (EOC).

BACKGROUND

Currently, operators in Emergency Operations Centers (EOCs) monitor communications from first responders at the scene of an emergency or event. The operators enter a summary of the monitored communications into EOC logs. The EOC logs are then used to provide information to other supporting entities associated with the EOC (e.g., fire, police, utilities, transportation). This methodology is prone to data entry errors from the human EOC operators, especially under stress conditions and during an actual emergency. Additionally, this methodology is prone to omission of critical information by human operators and is prone to potential delay of distribution of information within an EOC.

SUMMARY

Information is automatically distributed and managed by an Emergency Operations Center (EOC) via emails and various database collection and distribution systems. In an example configuration, speech provided by first responders at an emergency scene is automatically converted from speech to text. The text is stored in a database accessible by entities associated with the EOC, such as police departments, fire departments, utilities, transportation departments, local governments, or the like. In another example embodiment, information is automatically distributed and managed via an Internet Protocol (IP) network.

BRIEF DESCRIPTION OF THE DRAWINGS

The foregoing and other objects, aspects and advantages of automated management of information via an emergency operations center will be better understood from the following detailed description with reference to the drawings.

DETAILED DESCRIPTION OF ILLUSTRATIVE EMBODIMENTS

In various example embodiments, information is automatically distributed and managed by an Emergency Operations Center (EOC) via various combinations of emails, databases, Internet Protocol (IP) networks, speech to text converters, and distribution systems. In one example embodiment, information provided by a first responder is converted from speech to text, and the text is stored in an EOC database for access by various EOC related entities. In another example embodiment, information is provided by a first responder via an IP network. Via the IP network, the first responder has access to various services such as, instant messaging, Push-to-Talk over Cellular (PoC), Presence information, location based services, wireless priority services, multimedia priority services, voice of IP (VoIP), or a combination thereof. The information provided by the first responder, via the IP network is stored in an EOC database for access by various EOC related entities. In yet another example embodiment, VoIP information is converted to text, and the text is stored in an EOC database for access by various EOC related entities.

Figure 1:
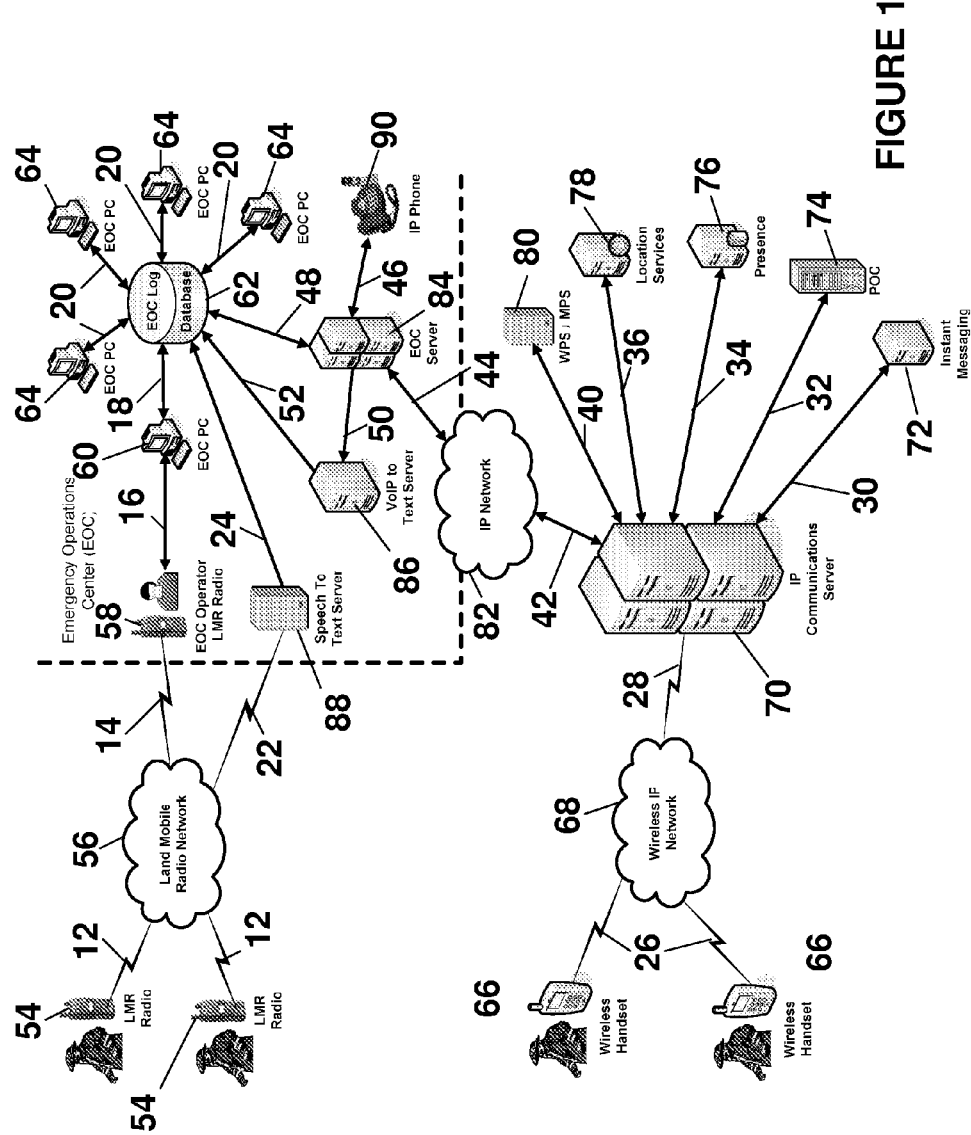
FIG. 1 is a diagram of an example process and system for automatically managing information via an emergency operations center.

FIG. 1 is a diagram of an example process and system for automatically managing information via an emergency operations center. At step 12, a first responder, utilizing a land mobile radio (LMR) 54 or the like, connects to the land mobile radio network 56. The LMR 54 and the land mobile radio network 56 are part of the Land Mobile Radio System (LMRS). The LMRS is a wireless communication system intended for terrestrial users. The LMRS is used by emergency first responder organizations, public works organizations, and/or commercial entities with large vehicle fleets. The first responder is typically one of the first public safety personnel to arrive at an emergency event or the like. The first responder provides information pertaining to the event to the EOC. In an example embodiment, the information is provided in the form of speech.

At step 14, the EOC operator 58 connects with the land mobile radio network 56. The EOC operator 58 monitors the communication (e.g., indicative of speech provided by first responder) provided by the first responder via the LMR radio 54 and the land mobile radio network 56. The EOC operator 58 creates a log entry indicative of the information received from the first responder. Thus, the EOC operator 58 formats the received information into an EOC log format. The log entry is provided to an EOC processor 60 act step 16. The log entry includes the EOC operator/s interpretation and summary of the information received from the first responder. At step 18, the log entry is stored in the EOC database 62. The log entries stored in the EOC database 62 are available to EOC related entities as depicted by EOC PC 64 in FIG. 1. Each EOC PC 64 depicted in FIG. 1 is representative of an EOC related entity of entities. Example EOC entities can include a fire department, a police department, a law enforcement agency, local governments, transportation departments, or the like.

At step 22, the information, indicative of speech, provided by the first responder via the land mobile radio network 56 is provided to a speech to text server 88. The speech to text server 88 can comprise any appropriate processor server computer or the like configured to convert speech to text. The speech to text server 88 converts the information indicative of speech to corresponding text. The speech to text server 88 formats the converted text into a log entry or log entries in accordance with an EOC log format. In an example embodiment, the EOC log if formatted in accordance with a product known as WeBEOC provided by ESI®. At step 24, the converted text (log entry or entries) is provided to the EOC database 62 for access by any or all of the EOC entities (depicted as EOC PC 64). Speech to text conversion (e.g., via speech to text server 88) can be accomplished concurrently with the provision of information to the EOC database 62 at steps 14, 16, and 18. Alternatively speech to text conversion can be accomplished instead of the provision of information to the EOC database 62 at steps 14, 16, and 18. Providing converted text to the EOC database 62 can mitigate, or illuminate, errors introduced by the EOC operator 58.

In another example embodiment, the first responder provides information to the EOC database 62 via a wireless Internet Protocol (IP) network. The Internet Protocol is a data oriented protocol used to communicate data across a packet switched network. Data to be provided by an Internet Protocol are encapsulated in packets. In accordance with this embodiment, at step 26, the first responder provides, via a wireless handset 66, information to a wireless IP network 68. The information provided by the first responder is provided to an IP communications server 70 at step 28. The IP communications server 70 connects to the wireless IP network 68 in the IP-based data connections. The IP communications server 70 can comprise any appropriate processor or the like configured to handle data formatted in an IP protocol.

Because an IP network is utilized, various IP related services are available to the first responder. For example, instant messaging services are available via instant messaging processor 72. A first responder can utilize instant messaging to, for example, interactively communicate with other first responders and/or EOC personnel individually or as a group discussion. At step 30, the IP communications server 70 connects with the instant messaging processor 72. Any or all of the instant messaging communications can be monitored and/or logged into the EOC database 62 via the IP communications server 70.

Push to Talk over Cellular (PoC) services also are available to the first responder, via PoC processor 74. A first responder can utilize PoC to, for example, interactively verbally communicate with other first responders and/or EOC personnel individually or as a group call. At step 32, the IP communications server 70 connects with the POC processor 74. Any portion or all of the PoC communications can be monitored and/or logged into the EOC database 62 via the IP communication server 70.

A first responder also can utilize presence information via presence processor 76. Presence information conveys the ability and/or willingness of a potential party to communicate. A first responder can utilize presence to, for example, identify other first responders and/or EOC personnel who are available on the network. A first responder can utilize presence to determine the status and current communication capabilities of other first responders and/or EOC personnel. At step 34, the IP communications server 70 connects with the presence processor 76. Any or all of the presence communications can be monitored and/or logged into the EOC database 62 via the IP communications server 70.

A first responder also can utilize location based services via location based services processor 78. A first responder can utilize location based services to, for example, determine the location of other first responders, to determine the location of other supporting resources, to determine the location and proximity of mobile command centers, or the like. At step 36, the IP communications server 70 connects with the location based services processor 78. Any portion or all of the location based services communications can be monitored and/or logged into the EOC database 62 via the IP communication server 70.

Wireless Priority Services (WPSs) and/or Multimedia Priority Services (MPSs) also are available to the first responder via WPS/MPS processor 80. The WPS is an system that allows high priority emergency telephone calls to avoid congestion on wireless telephone networks. The WPS provides means for bypassing congested wireless telephone. The MPS is a system that provides priority access for wireless multimedia communications. A first responder can utilize WPS/MPS to obtain wireless communications, which may be especially advantageous under conditions of network congestion or overload. At step 40, the IP communications server 70 connects with the WPS/MPS processor 80. Any or all of the WPS/MPS communications can be monitored and/or logged into the EOC database 62 via the IP communications server 70.

At step 42, the IP communications server 70 connects with the IP network 82. Information generated at steps 40, 36, 34, 32, and/or 30 is provided by the IP communications server 72 the IP network 82 at step 42. Additionally, Voice over IP (VoIP) information can be provided by the IP communications server 72 the IP network 82 at step 42. At step 44, the EOC server 84 establishes data communications with the IP network 82 and receives EOC related information from the IP communications server 70.

For VoIP services, the EOC server 84 establishes communication sessions between the first responders' handsets (depicted as IP Phone 90) and the VoIP capable phones in the emergency operations center at step 46. At step 48, the EOC server 84 provides to the EOC database 62, information received from the IP communications server 70. In an example embodiment, VoIP data is provided by the EOC server 84 to a VoIP to text server 86, at step 50. The VoIP text server 86 converts the VoIP data to text. The VoIP to text server 86 translates the VoIP data packets into text, e.g., text log entries, and stores the generated text log entries into the EOC database 62 at step 52.

EOC related entities, as depicted by EOC PC 64, have access to the information in the EOC database 62. Automatically managing and distributing EOC information and automatically providing EOC information to the EOC database 62 provides an efficient and accurate means of data management. Automatically managing and distributing EOC information provides information to the EOC database 62 more accurately and more quickly than can be accomplished via a human operator.

The land mobile radios 12 and the wireless handsets 66 are representative of any appropriate type of mobile device that can be utilized by a first responders or the like. Example mobile devices include any type of wireless receiver or transceiver device with broadcast reception capabilities (e.g., cell phone, pager, PDA, PC, specialized broadcast receiving device, first responder Mobile Data Terminal (MDT), FM/AM radio, NOAA weather radio, Land Mobile Radio (LMR), satellite radio receiver, satellite phone, and television).

The mobile devices 12, 66, can comprise any type of wireless receiver or transceiver device with broadcast reception capabilities (e.g., cell phone, pager, PDA, PC, specialized broadcast receiving device, first responder Mobile Data Terminal (MDT), FM/AM radio, NOAA weather radio, Land Mobile Radio (LMR), satellite radio receiver, satellite phone, and television). Example devices can comprise any appropriate mobile device, such as, for example, a portable device, a variety of computing devices including (a) a portable media player, e.g., a portable music player, such as an MP3 player, a Walkman, etc., (b) a portable computing device, such as a laptop, a personal digital assistant ("PDA"), a portable phone, such as a cell phone or the like, a smart phone, a Session Initiation Protocol (SIP) phone, a video phone, a portable email device, a thin client, a portable gaming device, etc., (c) consumer electronic devices, such as TVs, DVD players, set top boxes, monitors, displays, etc., (d) a public computing device, such as a kiosk, an in-store music sampling device, an automated teller machine (ATM), a cash register, etc., (e) a navigation device whether portable or installed in-vehicle and/or (f) a non-conventional computing device, such as a kitchen appliance, a motor vehicle control (e.g., steering wheel), etc., or a combination thereof.

The system configuration depicted in FIG. 1 is exemplary and not intended to imply a specific implementation. The processors 88, 60, 64, 86, 84, 70, 72, 74, 76, 78, and/or 80 can be implemented as respective single processors, a single processor, or various combinations of processors. Processors can be distributed or centrally located. Processors can communicate wirelessly, via hard wire, or a combination thereof.

Figure 2:
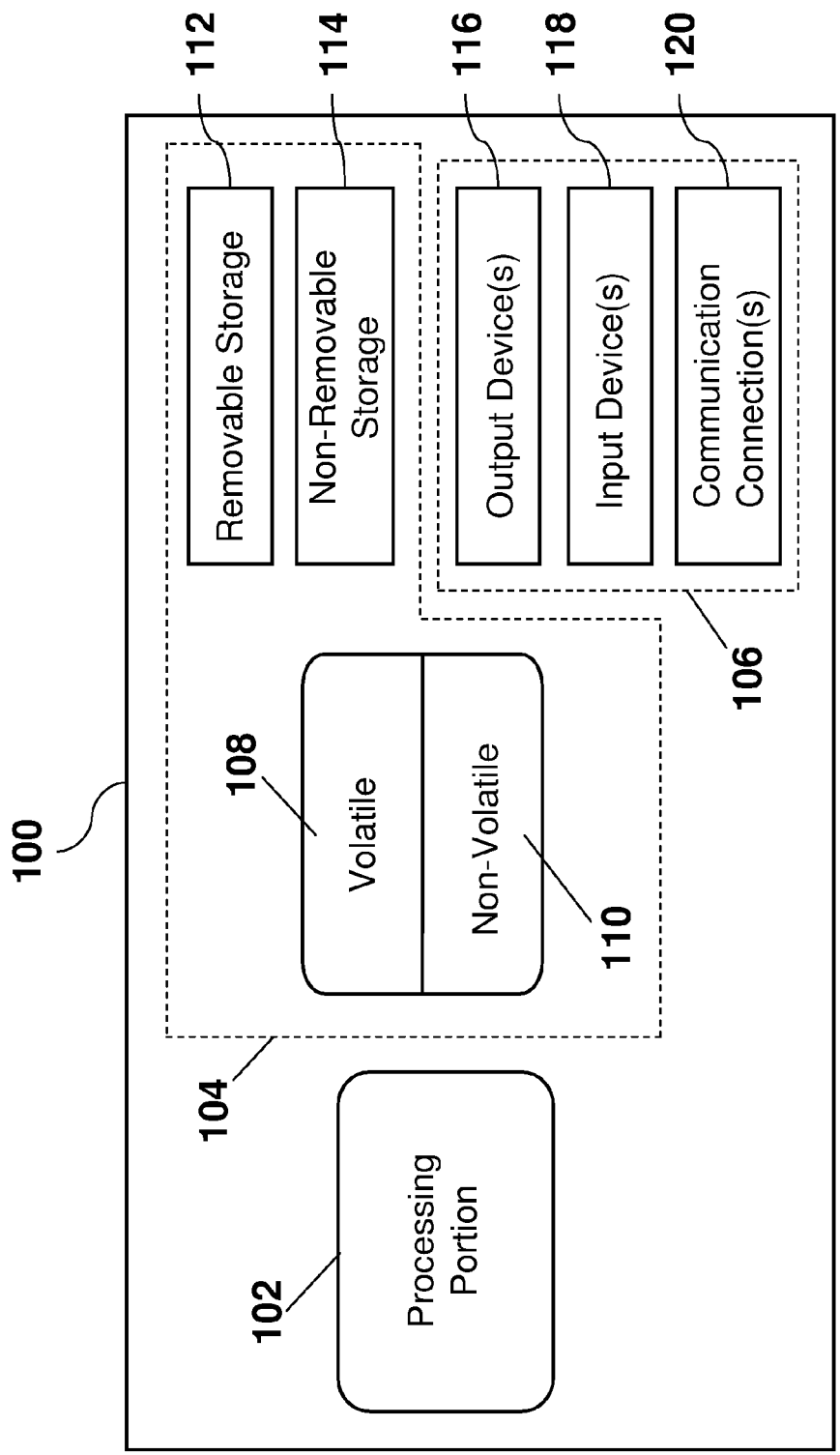
FIG. 2 is a block diagram of an example processor for automatically managing information via an emergency operations center.

FIG. 2 is a block diagram of an example processor 100 for automatically managing information via an emergency operations center. In an example configurations, the processor 100 comprises various combinations of processors 88, 60, 64, 86, 84, 70, 72, 74, 76, 78, and/or 80. Thus, the processor 100 can comprise the EOC PC 60, the EOC PC 64, the IP communications server 70, the VoIP to text server 86, the speech to text server 88, the EOC server 84, EOC database 62, the instant messaging processor 72, the PoC processor 74, the Presence processor 76, the location service is processor 78, the WPS/MPS processor 80 or any combination thereof.

The processor 100 comprises a processing portion 102, a memory portion 104, and an input/output portion 106. The processing portion 102, memory portion 104, and input/output portion 106 are coupled together (coupling not shown in FIG. 2) to allow communications therebetween. The processor 100 can be implemented as a client processor and/or a server processor.

The input/output portion 106 is capable of providing and/or receiving components utilized to automatically managing information via an emergency operations center as described above. For example, as described above, the input/output portion 106 is capable of providing/receiving first responder information, EOC log information, converted text, VoIP data, instant messaging information, push to talk over cellular PoC) information, Presence information, location services information, and WPS/MPS information, or combination thereof.

The processing portion 102 is capable of automatically managing information via an emergency operations center as described above. For example, the processing portion 102 is capable of converting speech to text, converting VoIP to text, managing EOC information, distributing EOC information, storing EOC information, providing access to EOC information, or accommodation thereof.

The memory portion 104 is capable of storing information associated with automatically managing information via an emergency operations center as described above. The memory portion 104 can comprise any appropriate storage for automatically managing information via an emergency operations center. For example, the memory portion 104 can comprise an EOC database (e.g., EOC database 62), and/or any combination of memory in or associated with the EOC PC 60, EOC PC 64, speech to text server 88, the VoIP to text server 86, EOC server 84, IP communications server 70, instant messaging processor 72, PoC processor 74, Presence processor 76, location services processor 78, and WPS/MPS processor 80, or any combination thereof. Depending upon the exact configuration and type of processor, the memory portion 104 can be volatile (such as RAM) 108, non-volatile (such as ROM, flash memory, etc.) 110, or a combination thereof. The processor 100 can have additional features/functionality. For example, the processor 100 can include additional storage (removable storage 112 and/or non-removable storage 114) including, but not limited to, magnetic or optical disks, tape, flash, smart cards or a combination thereof. Computer storage media, such as memory portion 104, 112, 114, 108, and 110, include volatile and nonvolatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, universal serial bus (USB) compatible memory, smart cards, or any other medium which can be used to store the desired information and which can be accessed by the processor 100. Any such computer storage media can be part of the processor 100.

The processor 100 can also contain communications connection(s) 120 that allow the processor 100 to communicate with other devices, for example. Communications connection(s) 120 is an example of communication media. Communication media typically embody computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media. The processor 100 also can have input device(s) 118 such as keyboard, mouse, pen, voice input device, touch input device, etc. Output device(s) 116 such as a display, speakers, printer, etc. also can be included.

The following description sets forth some exemplary telephony radio networks and non-limiting operating environments in which automatic management of information via an emergency operations center can be implemented. The below-described operating environments should be considered non-exhaustive, however, and thus the below-described network architectures merely show how automatic management of information via an emergency operations center can be incorporated into existing network structures and architectures. It can be appreciated, however, that automatic management of information via an emergency operations center can be incorporated into existing and/or future alternative architectures for communication networks as well.

The global system for mobile communication ("GSM") is one of the most widely utilized wireless access systems in today's fast growing communication environment. The GSM provides circuit-switched data services to subscribers, such as mobile telephone or computer users. The General Packet Radio Service ("GPRS"), which is an extension to GSM technology, introduces packet switching to GSM networks. The GPRS uses a packet-based wireless communication technology to transfer high and low speed data and signaling in an efficient manner. The GPRS attempts to optimize the use of network and radio resources, thus enabling the cost effective and efficient use of GSM network resources for packet mode applications.

As one of ordinary skill in the art can appreciate, the exemplary GSM/GPRS environment and services described herein also can be extended to 3G services, such as Universal Mobile Telephone System ("UMTS"), Frequency Division Duplexing ("FDD") and Time Division Duplexing ("TDD"), High Speed Packet Data Access ("HSPDA"), cdma2000 1x Evolution Data Optimized ("EVDO"), Code Division Multiple Access-2000 ("cdma2000"), Time Division Synchronous Code Division Multiple Access ("TD-SCDMA"), Wideband Code Division Multiple Access ("WCDMA"), Enhanced Data GSM Environment ("EDGE"), International Mobile Telecommunications-2000 ("IMT-2000"), Digital Enhanced Cordless Telecommunications ("DECT"), etc., as well as to other network services that become available in time. In this regard, the techniques of automatically managing information via an emergency operations center can be applied independently of the method for data transport, and do not depend on any particular network architecture, or underlying protocols.

Figure 3:
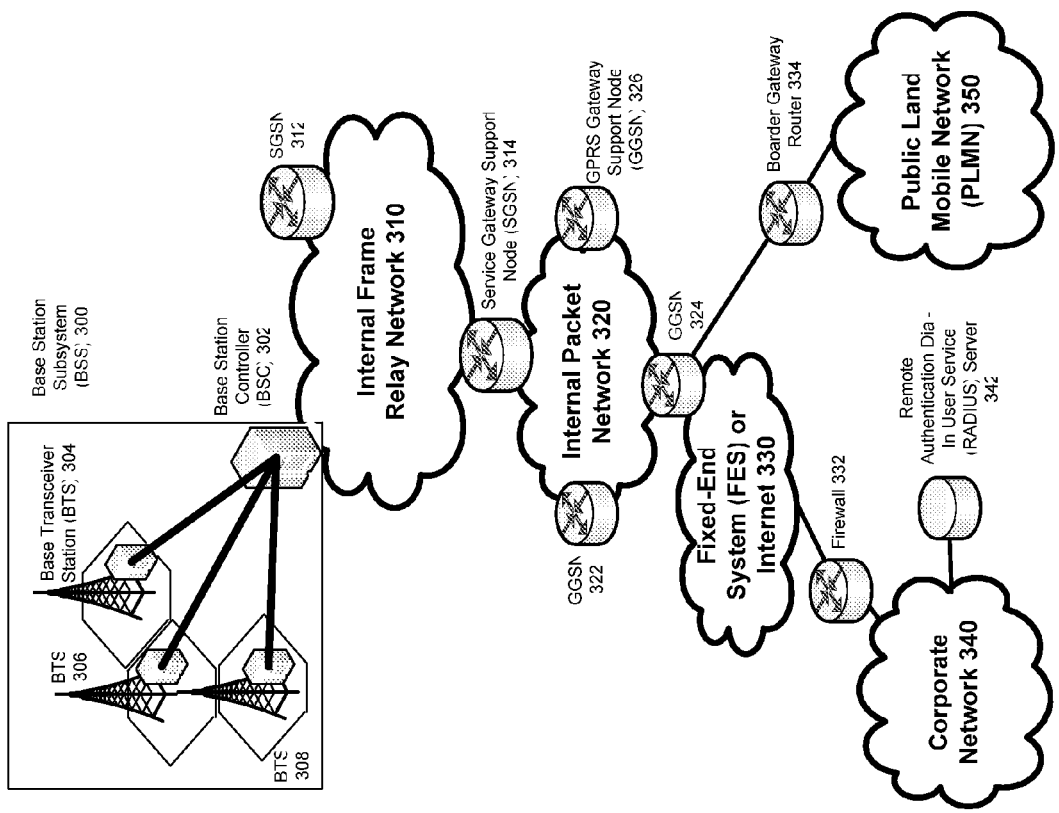
FIG. 3 depicts an overall block diagram of an exemplary packet-based mobile cellular network environment, such as a GPRS network, in which the system for implementing automatic management of information via an emergency operations center can be practiced.

FIG. 3 depicts an overall block diagram of an exemplary packet-based mobile cellular network environment, such as a GPRS network, in which the system for implementing automatic management of information via an emergency operations center can be practiced. In an example configuration, the land mobile radio network 56, the wireless IP network 38, the IP network 82, or a combination thereof, are encompassed by the network environment depicted in FIG. 3. In such an environment, there are a plurality of Base Station Subsystems ("BSS") 300 (only one is shown), each of which comprises a Base Station Controller ("BSC") 302 serving a plurality of Base Transceiver Stations ("BTS") such as BTSs 304, 306, and 308. BTSs 304, 306, 308, etc. are the access points where users of packet-based mobile devices (e.g., mobile device 12) become connected to the wireless network. In exemplary fashion, the packet traffic originating from user devices (e.g., user device 30) is transported via an over-the-air interface to a BTS 308, and from the BTS 308 to the BSC 302. Base station subsystems, such as BSS 300, are a part of internal frame relay network 310 that can include Service GPRS Support Nodes ("SGSN") such as SGSN 312 and 314. Each SGSN is connected to an internal packet network 320 through which a SGSN 312, 314, etc. can route data packets to and from a plurality of gateway GPRS support nodes (GGSN) 322, 324, 326, etc. As illustrated, SGSN 314 and GGSNs 322, 324, and 326 are part of internal packet network 320. Gateway GPRS serving nodes 322, 324 and 326 mainly provide an interface to external Internet Protocol ("IP") networks such as Public Land Mobile Network ("PLMN") 350, corporate intranets 340, or Fixed-End System ("FES") or the public Internet 330. As illustrated, subscriber corporate network 340 may be connected to GGSN 324 via firewall 332; and PLMN 350 is connected to GGSN 324 via border gateway router 334. The Remote Authentication Dial-In User Service ("RADIUS") server 342 may be used for caller authentication when a user of a mobile cellular device calls corporate network 340.

Generally, there can be four different cell sizes in a GSM network, referred to as macro, micro, pico, and umbrella cells. The coverage area of each cell is different in different environments. Macro cells can be regarded as cells in which the base station antenna is installed in a mast or a building above average roof top level. Micro cells are cells whose antenna height is under average roof top level. Micro-cells are typically used in urban areas. Pico cells are small cells having a diameter of a few dozen meters. Pico cells are used mainly indoors. On the other hand, umbrella cells are used to cover shadowed regions of smaller cells and fill in gaps in coverage between those cells.

Figure 4:
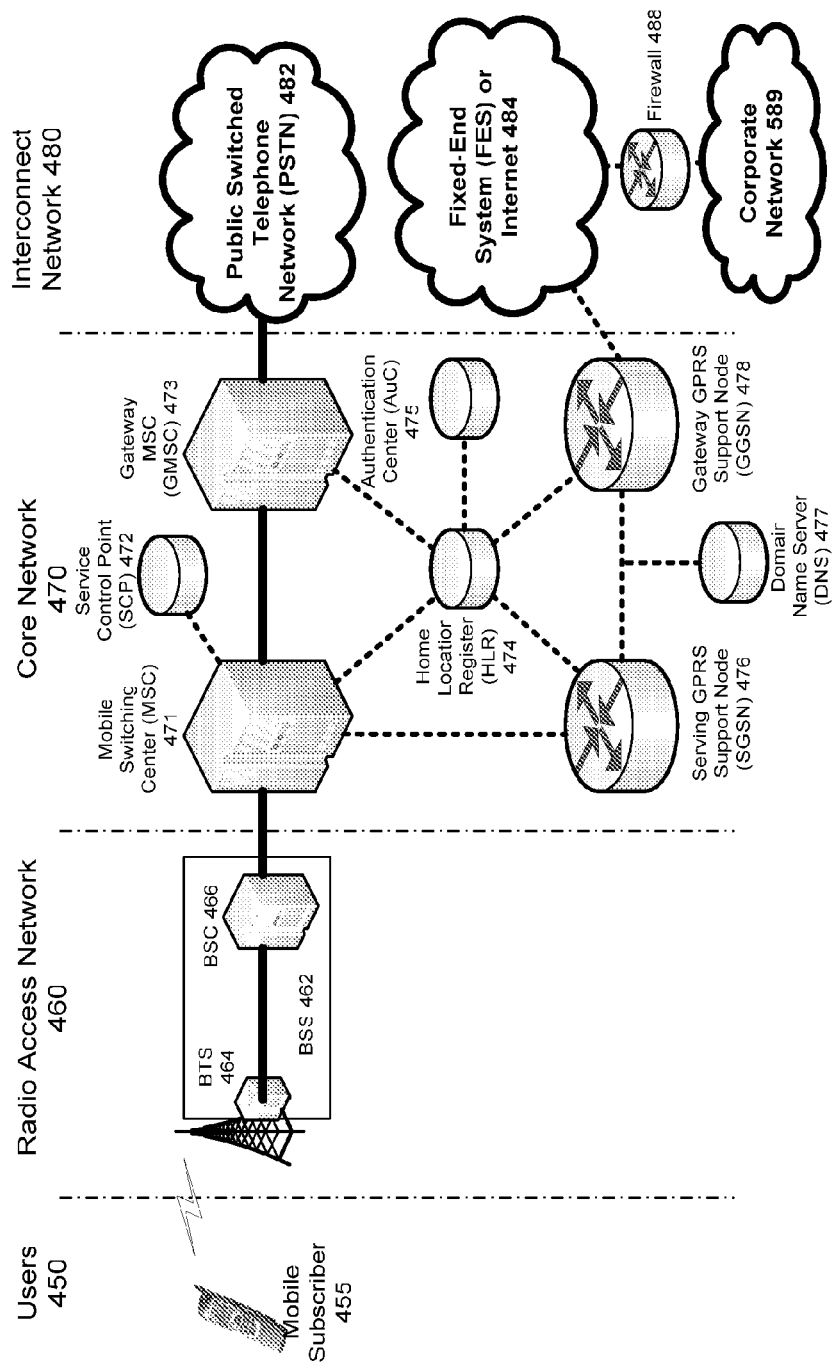
FIG. 4 illustrates an architecture of a typical GPRS network.

FIG. 4 illustrates an architecture of a typical GPRS network as segmented into four groups: users 450, radio access network 460, core network 470, and interconnect network 480. In an example configuration the emergency alert network 110, and the wireless broadcast network 116 are encompassed by the radio access network 460, core network 470, and interconnect network 480. Users 450 comprise a plurality of end users (though only mobile subscriber 455 is shown in FIG. 4). In an example embodiment, the device depicted as mobile subscriber 455 comprises mobile device 12. Radio access network 460 comprises a plurality of base station subsystems such as BSSs 462, which include BTSs 464 and BSCs 466. Core network 470 comprises a host of various network elements. As illustrated here, core network 470 may comprise Mobile Switching Center ("MSC") 471, Service Control Point ("SCP") 472, gateway MSC 473, SGSN 476, Home Location Register ("HLR") 474, Authentication Center ("AuC") 475, Domain Name Server ("DNS") 477, and GGSN 478. Interconnect network 480 also comprises a host of various networks and other network elements. As illustrated in FIG. 4, interconnect network 480 comprises Public Switched Telephone Network ("PSTN") 482, Fixed-End System ("FES") or Internet 484, firewall 488, and Corporate Network 489.

A mobile switching center can be connected to a large number of base station controllers. At MSC 471, for instance, depending on the type of traffic, the traffic may be separated in that voice may be sent to Public Switched Telephone Network ("PSTN") 482 through Gateway MSC ("GMSC") 473, and/or data may be sent to SGSN 476, which then sends the data traffic to GGSN 478 for further forwarding.

When MSC 471 receives call traffic, for example, from BSC 466, it sends a query to a database hosted by SCP 472. The SCP 472 processes the request and issues a response to MSC 471 so that it may continue call processing as appropriate.

The HLR 474 is a centralized database for users to register to the GPRS network. HLR 474 stores static information about the subscribers such as the International Mobile Subscriber Identity ("IMSI"), subscribed services, and a key for authenticating the subscriber. HLR 474 also stores dynamic subscriber information such as the current location of the mobile subscriber. Associated with HLR 474 is AuC 475. AuC 475 is a database that contains the algorithms for authenticating subscribers and includes the associated keys for encryption to safeguard the user input for authentication.

In the following, depending on context, the term "mobile subscriber" sometimes refers to the end user and sometimes to the actual portable device, such as the mobile device 12, used by an end user of the mobile cellular service. When a mobile subscriber turns on his or her mobile device, the mobile device goes through an attach process by which the mobile device attaches to an SGSN of the GPRS network. In FIG. 4, when mobile subscriber 455 initiates the attach process by turning on the network capabilities of the mobile device, an attach request is sent by mobile subscriber 455 to SGSN 476. The SGSN 476 queries another SGSN, to which mobile subscriber 455 was attached before, for the identity of mobile subscriber 455. Upon receiving the identity of mobile subscriber 455 from the other SGSN, SGSN 476 requests more information from mobile subscriber 455. This information is used to authenticate mobile subscriber 455 to SGSN 476 by HLR 474. Once verified, SGSN 476 sends a location update to HLR 474 indicating the change of location to a new SGSN, in this case SGSN 476. HLR 474 notifies the old SGSN, to which mobile subscriber 455 was attached before, to cancel the location process for mobile subscriber 455. HLR 474 then notifies SGSN 476 that the location update has been performed. At this time, SGSN 476 sends an Attach Accept message to mobile subscriber 455, which in turn sends an Attach Complete message to SGSN 476.

After attaching itself with the network, mobile subscriber 455 then goes through the authentication process. In the authentication process, SGSN 476 sends the authentication information to HLR 474, which sends information back to SGSN 476 based on the user profile that was part of the user's initial setup. The SGSN 476 then sends a request for authentication and ciphering to mobile subscriber 455. The mobile subscriber 455 uses an algorithm to send the user identification (ID) and password to SGSN 476. The SGSN 476 uses the same algorithm and compares the result. If a match occurs, SGSN 476 authenticates mobile subscriber 455.

Next, the mobile subscriber 455 establishes a user session with the destination network, corporate network 489, by going through a Packet Data Protocol ("PDP") activation process. Briefly, in the process, mobile subscriber 455 requests access to the Access Point Name ("APN"), for example, UPS.com (e.g., which can be corporate network 489 in FIG. 4) and SGSN 476 receives the activation request from mobile subscriber 455. SGSN 476 then initiates a Domain Name Service ("DNS") query to learn which GGSN node has access to the UPS.com APN. The DNS query is sent to the DNS server within the core network 470, such as DNS 477, which is provisioned to map to one or more GGSN nodes in the core network 470. Based on the APN, the mapped GGSN 478 can access the requested corporate network 489. The SGSN 476 then sends to GGSN 478 a Create Packet Data Protocol ("PDP") Context Request message that contains necessary information. The GGSN 478 sends a Create PDP Context Response message to SGSN 476, which then sends an Activate PDP Context Accept message to mobile subscriber 455.

Once activated, data packets of the call made by mobile subscriber 455 can then go through radio access network 460, core network 470, and interconnect network 480, in a particular fixed-end system or Internet 484 and firewall 488, to reach corporate network 489.

Thus, network elements that can invoke the functionality of automatic management of information via an emergency operations center can include but are not limited to Gateway GPRS Support Node tables, Fixed End System router tables, firewall systems, VPN tunnels, and any number of other network elements as required by the particular digital network.

Figure 5:
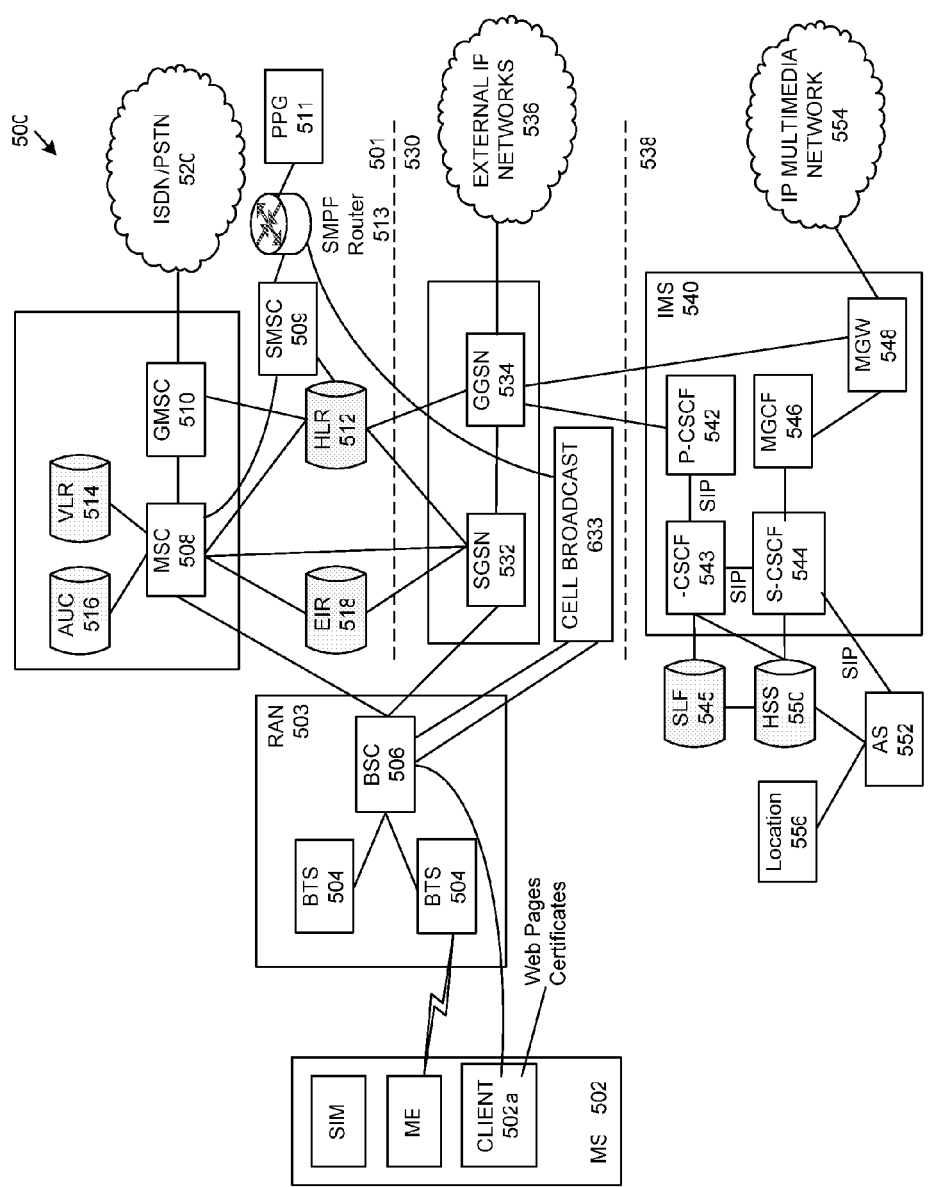
FIG. 5 illustrates another exemplary block diagram view of a GSM/GPRS/IP multimedia network architecture in which automatic management of information via an emergency operations center can be incorporated.

FIG. 5 illustrates another exemplary block diagram view of a GSM/GPRS/IP multimedia network architecture 500 in which automatic management of information via an emergency operations center can be incorporated. As illustrated, architecture 500 of FIG. 5 includes a GSM core network 501, a GPRS network 530 and an IP multimedia network 538. The GSM core network 501 includes a Mobile Station (MS) 502, at least one Base Transceiver Station (BTS) 504 and a Base Station Controller (BSC) 506. The MS 502 is physical equipment or Mobile Equipment (ME), such as a mobile phone or a laptop computer (e.g., mobile device 12) that is used by mobile subscribers, with a Subscriber identity Module (SIM). The SIM includes an International Mobile Subscriber Identity (IMSI), which is a unique identifier of a subscriber. The BTS 504 is physical equipment, such as a radio tower, that enables a radio interface to communicate with the MS. Each BTS may serve more than one MS. The BSC 506 manages radio resources, including the BTS. The BSC may be connected to several BTSs. The BSC and BTS components, in combination, are generally referred to as a base station (BSS) or radio access network (RAN) 503.

The GSM core network 501 also includes a Mobile Switching Center (MSC) 508, a Gateway Mobile Switching Center (GMSC) 510, a Home Location Register (HLR) 512, Visitor Location Register (VLR) 514, an Authentication Center (AuC) 518, and an Equipment Identity Register (EIR) 516. The MSC 508 performs a switching function for the network. The MSC also performs other functions, such as registration, authentication, location updating, handovers, and call routing. The GMSC 510 provides a gateway between the GSM network and other networks, such as an Integrated Services Digital Network (ISDN) or Public Switched Telephone Networks (PSTNs) 520. Thus, the GMSC 510 provides interworking functionality with external networks.

The HLR 512 is a database that contains administrative information regarding each subscriber registered in a corresponding GSM network. The HLR 512 also contains the current location of each MS. The VLR 514 is a database that contains selected administrative information from the HLR 512. The VLR contains information necessary for call control and provision of subscribed services for each MS currently located in a geographical area controlled by the VLR. The HLR 512 and the VLR 514, together with the MSC 508, provide the call routing and roaming capabilities of GSM. The AuC 516 provides the parameters needed for authentication and encryption functions. Such parameters allow verification of a subscriber's identity. The EIR 518 stores security-sensitive information about the mobile equipment.

A Short Message Service Center (SMSC) 509 allows one-to-one Short Message Service (SMS) messages to be sent to/from the MS 502. A Push Proxy Gateway (PPG) 511 is used to "push" (i.e., send without a synchronous request) content to the MS 502. The PPG 511 acts as a proxy between wired and wireless networks to facilitate pushing of data to the MS 502. A Short Message Peer to Peer (SMPP) protocol router 513 is provided to convert SMS-based SMPP messages to cell broadcast messages. SMPP is a protocol for exchanging SMS messages between SMS peer entities such as short message service centers. The SMPP protocol is often used to allow third parties, e.g., content suppliers such as news organizations, to submit bulk messages.

To gain access to GSM services, such as speech, data, and short message service (SMS), the MS first registers with the network to indicate its current location by performing a location update and IMSI attach procedure. The MS 502 sends a location update including its current location information to the MSC/VLR, via the BTS 504 and the BSC 506. The location information is then sent to the MS's HLR. The HLR is updated with the location information received from the MSC/VLR. The location update also is performed when the MS moves to a new location area. Typically, the location update is periodically performed to update the database as location updating events occur.

The GPRS network 530 is logically implemented on the GSM core network architecture by introducing two packet-switching network nodes, a serving GPRS support node (SGSN) 532, a cell broadcast and a Gateway GPRS support node (GGSN) 534. The SGSN 532 is at the same hierarchical level as the MSC 508 in the GSM network. The SGSN controls the connection between the GPRS network and the MS 502. The SGSN also keeps track of individual MS's locations and security functions and access controls.

A Cell Broadcast Center (CBC) 533 communicates cell broadcast messages that are typically delivered to multiple users in a specified area. Cell Broadcast is one-to-many geographically focused service. It enables messages to be communicated to multiple mobile phone customers who are located within a given part of its network coverage area at the time the message is broadcast.

The GGSN 534 provides a gateway between the GPRS network and a public packet network (PDN) or other IP networks 536. That is, the GGSN provides interworking functionality with external networks, and sets up a logical link to the MS through the SGSN. When packet-switched data leaves the GPRS network, it is transferred to an external TCP-IP network 536, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services can be used in parallel. The MS can operate in one three classes: class A, class B, and class C. A class A MS can attach to the network for both GPRS services and GSM services simultaneously. A class A MS also supports simultaneous operation of GPRS services and GSM services. For example, class A mobiles can receive GSM voice/data/SMS calls and GPRS data calls at the same time.

A class B MS can attach to the network for both GPRS services and GSM services simultaneously. However, a class B MS does not support simultaneous operation of the GPRS services and GSM services. That is, a class B MS can only use one of the two services at a given time.

A class C MS can attach for only one of the GPRS services and GSM services at a time. Simultaneous attachment and operation of GPRS services and GSM services is not possible with a class C MS.

A GPRS network 530 can be designed to operate in three network operation modes (NOM1, NOM2 and NOM3). A network operation mode of a GPRS network is indicated by a parameter in system information messages transmitted within a cell. The system information messages dictates a MS where to listen for paging messages and how signal towards the network. The network operation mode represents the capabilities of the GPRS network. In a NOM1 network, a MS can receive pages from a circuit switched domain (voice call) when engaged in a data call. The MS can suspend the data call or take both simultaneously, depending on the ability of the MS. In a NOM2 network, a MS may not received pages from a circuit switched domain when engaged in a data call, since the MS is receiving data and is not listening to a paging channel In a NOM3 network, a MS can monitor pages for a circuit switched network while received data and vise versa.

The IP multimedia network 538 was introduced with 3GPP Release 5, and includes an IP multimedia subsystem (IMS) 540 to provide rich multimedia services to end users. A representative set of the network entities within the IMS 540 are a call/session control function (CSCF), a media gateway control function (MGCF) 546, a media gateway (MGW) 548, and a master subscriber database, called a home subscriber server (HSS) 550. The HSS 550 may be common to the GSM network 501, the GPRS network 530 as well as the IP multimedia network 538.

The IP multimedia system 540 is built around the call/session control function, of which there are three types: an interrogating CSCF (I-CSCF) 543, a proxy CSCF (P-CSCF) 542, and a serving CSCF (S-CSCF) 544. The P-CSCF 542 is the MS's first point of contact with the IMS 540. The P-CSCF 542 forwards session initiation protocol (SIP) messages received from the MS to an SIP server in a home network (and vice versa) of the MS. The P-CSCF 542 may also modify an outgoing request according to a set of rules defined by the network operator (for example, address analysis and potential modification).

The I-CSCF 543, forms an entrance to a home network and hides the inner topology of the home network from other networks and provides flexibility for selecting an S-CSCF. The I-CSCF 543 may contact a subscriber location function (SLF) 545 to determine which HSS 550 to use for the particular subscriber, if multiple HSS's 550 are present. The S-CSCF 544 performs the session control services for the MS 502. This includes routing originating sessions to external networks and routing terminating sessions to visited networks. The S-CSCF 544 also decides whether an application server (AS) 552 is required to receive information on an incoming SIP session request to ensure appropriate service handling. This decision is based on information received from the HSS 550 (or other sources, such as an application server 552). The AS 552 also communicates to a location server 556 (e.g., a Gateway Mobile Location Center (GMLC)) that provides a position (e.g., latitude/longitude coordinates) of the MS 502.

The HSS 550 contains a subscriber profile and keeps track of which core network node is currently handling the subscriber. It also supports subscriber authentication and authorization functions (AAA). In networks with more than one HSS 550, a subscriber location function provides information on the HSS 550 that contains the profile of a given subscriber.

The MGCF 546 provides interworking functionality between SIP session control signaling from the IMS 540 and ISUP/BICC call control signaling from the external GSTN networks (not shown). It also controls the media gateway (MGW) 548 that provides user-plane interworking functionality (e.g., converting between AMR- and PCM-coded voice). The MGW 548 also communicates with other IP multimedia networks 554.

Push to Talk over Cellular (PoC) capable mobile phones register with the wireless network when the phones are in a predefined area (e.g., job site, etc.). When the mobile phones leave the area, they register with the network in their new location as being outside the predefined area. This registration, however, does not indicate the actual physical location of the mobile phones outside the pre-defined area.

While example embodiments of automatic management of information via an emergency operations center have been described in connection with various computing devices, the underlying concepts can be applied to any computing device or system capable of implementing automatic management of information via an emergency operations center. The various techniques described herein can be implemented in connection with hardware or software or, where appropriate, with a combination of both. Thus, the methods and apparatus for generating, selecting, and/or implementing automatic management of information via an emergency operations center, or certain aspects or portions thereof, can take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for implementing automatic management of information via an emergency operations center. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. In any case, the language can be a compiled or interpreted language, and combined with hardware implementations.

The methods and apparatus for automatic management of information via an emergency operations center also can be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for implementing automatic management of information via an emergency operations center. When implemented on a general-purpose processor, the program code combines with the processor to provide a unique apparatus that operates to invoke the functionality of automatic management of information via an emergency operations center. Additionally, any storage techniques used in connection with automatic management of information via an emergency operations center can invariably be a combination of hardware and software.

While automatic management of information via an emergency operations center has been described in connection with the various embodiments of the various figures, it is to be understood that other similar embodiments can be used or modifications and additions can be made to the described embodiment for performing the same function of automatic management of information via an emergency operations center without deviating therefrom. For example, one skilled in the art will recognize that a system for automatic management of information via an emergency operations center as described may apply to any environment, whether wired or wireless, and may be applied to any number of devices connected via a communications network and interacting across the network. Therefore, automatic management of information via an emergency operations center should not be limited to any single embodiment, but rather should be construed in breadth and scope in accordance with the appended claims.

What is claimed is:

1. A method comprising:
receiving, by a processor, via an internet protocol (IP) network, information pertaining to an event, wherein:
the information is indicative of speech;
the information is formatted in accordance with a voice over internet protocol (VoIP);
the information is indicative of being provided by a P25 land mobile radio, via a federally regulated land mobile radio system;
providing the information for storage, wherein the stored information is available for access by at least one entity associated with an emergency operations center;
automatically converting the VoIP formatted information to text;
automatically formatting, by the processor, the text in accordance with a WebEOC emergency operations center log format; and
providing the formatted text for storage, wherein the stored formatted text is available for access by at least one entity associated with the emergency operations center.

2. The method of claim 1, further comprising providing an instant messaging service to an originator of the information.

3. The method of claim 1, further comprising providing a Push-to-talk over Cellular service to an originator of the information.

4. The method of claim 1, further comprising providing a Presence service to an originator of the information.

5. The method of claim 1, further comprising providing a location based service to an originator of the information.

6. The method of claim 1, further comprising providing a wireless priority service to an originator of the information.

7. The method of claim 1, further comprising providing a multimedia priority service to an originator of the information.

8. A system comprising:
memory having executable instructions stored thereon; and
a processor coupled to the memory, the processor configured to execute the executable instructions to effectuate operations comprising:
receiving, via an internet protocol (IP) network, information pertaining to an event, wherein:
the information is indicative of speech;
the information is formatted in accordance with a voice over internet protocol (VoIP);
the information is indicative of being provided by a P25 land mobile radio, via a federally regulated land mobile radio system;
providing the information for storage, wherein the stored information is available for access by at least one entity associated with an emergency operations center;
providing at least one service to an originator of the information;
automatically converting the VoIP formatted information to text;
automatically formatting the text in accordance with a WebEOC emergency operations center log format; and
providing the formatted text for storage, wherein the stored formatted text is available for access by the at least one entity associated with the emergency operations center.

9. The system of claim 8, the operations further comprising providing an instant messaging service to the originator of the information.

10. The system of claim 8, the operations further comprising providing a Push-to-talk over Cellular service to the originator of the information.

11. The system of claim 8, the operations further comprising providing a Presence service to the originator of the information.

12. The system of claim 8, the operations further comprising providing a location based service to the originator of the information.

13. The system of claim 8, the operations further comprising providing a wireless priority service to the originator of the information.

14. The system of claim 8, the operations further comprising providing a multimedia priority service to the originator of the information.

15. A computer readable storage medium that is not a transient signal per se, the computer readable storage medium having stored thereon executable instructions that when executed by a processor cause the performance of operations comprising:
receiving, by a processor, via an internet protocol (IP) network, information pertaining to an event, wherein:
the information is indicative of speech;
the information is formatted in accordance with a voice over internet protocol (VoIP);
the information is indicative of being provided by a P25 land mobile radio, via a federally regulated land mobile radio system;
providing the information for storage, wherein the stored information is available for access by at least one entity associated with an emergency operations center;
automatically converting the VoIP formatted information to text;

automatically formatting, by the processor, the text in accordance with a WebEOC emergency operations center log format; and providing the formatted text for storage, wherein the stored formatted text is available for access by at least one entity associated with the emergency operations center.

16. The computer readable storage medium of claim 15, the operations further comprising providing an instant messaging service to an originator of the information.

17. The computer readable storage medium of claim 15, the operations further comprising providing a Push-to-talk over Cellular service to an originator of the information.

18. The computer readable storage medium of claim 15, the operations further comprising providing a Presence service to an originator of the information.

19. The computer readable storage medium of claim 15, the operations further comprising providing at least one of:
   a location based service to an originator of the information;
   a wireless priority service to an originator of the information; or
   a multimedia priority service to an originator of the information.

* * * * *